(12) United States Patent
Arian

(10) Patent No.: US 12,661,307 B2
(45) Date of Patent: Jun. 23, 2026

(54) NURSING BOTTLE WITH DUAL CHAMBER

(71) Applicant: Afshin Arian, Las Vegas, NV (US)

(72) Inventor: Afshin Arian, Las Vegas, NV (US)

( * ) Notice: Subject to any disclaimer, the term of this patent is extended or adjusted under 35 U.S.C. 154(b) by 262 days.

(21) Appl. No.: 18/469,131

(22) Filed: Sep. 18, 2023

(65) Prior Publication Data

US 2025/0090425 A1     Mar. 20, 2025

(51) Int. Cl.
*A61J 11/00*     (2006.01)
*A61C 17/02*     (2006.01)
*A61J 9/00*     (2006.01)

(52) U.S. Cl.
CPC ................. *A61J 9/00* (2013.01); *A61C 17/02* (2013.01)

(58) Field of Classification Search
CPC . A61C 17/02; A61J 9/00; A61J 7/0053; A61J 11/0035; A61J 11/00
USPC ....................................................... 214/11.1
See application file for complete search history.

(56) References Cited

U.S. PATENT DOCUMENTS

| | | | | |
|---|---|---|---|---|
| 609,415 | A | * | 8/1898 | Lankford ................... A61J 9/04 |
| | | | | 215/11.5 |
| 1,270,693 | A | * | 6/1918 | Caldwell ................... A61J 9/00 |
| | | | | 215/11.1 |
| 2,223,179 | A | * | 11/1940 | Lougheed ............ A61J 11/0015 |
| | | | | 215/11.1 |
| 2,582,950 | A | * | 1/1952 | Alstadt ................... A61J 11/045 |
| | | | | 215/11.5 |
| 2,655,920 | A | * | 10/1953 | Cronin ................. A61J 11/0025 |
| | | | | 215/11.1 |

| | | | | |
|---|---|---|---|---|
| 2,774,500 | A | * | 12/1956 | Budiani ................. A61J 11/001 |
| | | | | 215/11.1 |
| 4,821,895 | A | * | 4/1989 | Roskilly ............... A61J 7/0053 |
| | | | | 215/390 |
| 4,856,995 | A | | 8/1989 | Wagner |
| 5,029,701 | A | | 7/1991 | Roth et al. |
| 5,244,122 | A | * | 9/1993 | Botts ......................... A61J 9/00 |
| | | | | D24/114 |
| 5,437,381 | A | | 8/1995 | Herrmann |
| 5,456,090 | A | | 10/1995 | McCoy |
| 5,542,922 | A | | 8/1996 | Petterson et al. |

(Continued)

FOREIGN PATENT DOCUMENTS

| | | |
|---|---|---|
| CN | 200994928 Y | 12/2007 |
| CN | 215308471 U | 12/2021 |
| EP | 3192747 B1 | 8/2018 |

OTHER PUBLICATIONS

Amazon.com, Dr. Brown's Original Bottle Specialty Feeding Set, 2023, available at https://www.amazon.com/Dr-Browns-Original-Specialty-Feeding/dp/B00UVZXUKG?th=1 (last retrieved Apr. 18, 2023).

*Primary Examiner* — Gideon R Weinerth

(74) *Attorney, Agent, or Firm* — Abdul Ghani Hamadi

(57)     ABSTRACT

A nursing bottle is provided for reducing tooth decay in a user. Embodiments provide a nursing bottle having a first chamber for containing a first liquid to feed an infant, such that the first liquid dispenses through lateral openings of a nipple. The bottle includes a second chamber sealed by a stopper having an extension extending into a nipple. Once the infant has fed on a volume of first liquid, a second liquid dispenses from the second chamber through the extension to a central opening of the nipple. The second liquid rinses the first liquid from the teeth of the infant during feeding, reducing sugars that cause tooth decay.

19 Claims, 4 Drawing Sheets

(56)    References Cited

U.S. PATENT DOCUMENTS

| | | | | |
|---|---|---|---|---|
| 5,824,012 | A | * | 10/1998 | Burchett ............... A61J 7/0053 |
| | | | | 604/82 |
| 5,897,007 | A | | 4/1999 | Schein et al. |
| 5,960,971 | A | | 10/1999 | Bral |
| 6,126,679 | A | * | 10/2000 | Botts ..................... A61J 7/0053 |
| | | | | 215/11.1 |
| 6,454,788 | B1 | * | 9/2002 | Ashton ................. A61J 7/0053 |
| | | | | 606/236 |
| 6,588,613 | B1 | * | 7/2003 | Pechenik ............... A61J 11/001 |
| | | | | 215/11.1 |
| 6,981,962 | B1 | * | 1/2006 | Lenkersdorf ............ A61J 9/00 |
| | | | | 604/218 |
| 7,850,043 | B2 | | 12/2010 | Foster |
| 8,033,409 | B2 | | 10/2011 | Lindemann |
| 8,881,920 | B1 | | 11/2014 | Bral |
| 10,413,926 | B2 | | 9/2019 | Gonzalez et al. |
| 2006/0213857 | A1 | | 9/2006 | Chen et al. |
| 2006/0278597 | A1 | * | 12/2006 | Daugherty .............. G01F 19/00 |
| | | | | 215/396 |
| 2012/0012550 | A1 | * | 1/2012 | Boonprasop ............. A61J 11/02 |
| | | | | 215/11.4 |
| 2015/0164748 | A1 | * | 6/2015 | Brown ................. A61J 11/0015 |
| | | | | 215/11.5 |
| 2018/0021223 | A1 | * | 1/2018 | Luo ........................... A61J 9/04 |
| | | | | 215/11.5 |
| 2025/0090425 | A1 | * | 3/2025 | Arian ........................ A61J 9/00 |

* cited by examiner

NURSING BOTTLE WITH DUAL CHAMBER

TECHNICAL FIELD

The present specification relates to nursing bottles for infants, and specifically to nursing bottles that reduce baby bottle syndrome.

BACKGROUND

Baby bottle syndrome, also known as bottle mouth syndrome or bottle tooth syndrome, is a medical condition exhibiting tooth decay in infants and young children. Tooth decay often results when infants have prolonged exposure to cariogenic liquids (i.e., liquids that cause tooth decay, such as sugary liquids). Infants typically consume cariogenic liquids including milk, formula, fruit juices, or any other suitable sweetened liquid. Infants that use a nursing bottle as a sleep aid are particularly susceptible to such tooth decay. When the infant falls asleep any remaining liquid in the bottle can pool behind or beside the infant's teeth, particularly the primary (baby) front teeth. The process involves the gradual breakdown of tooth enamel and structure due to the interaction between bacteria, sugars, and acids. Specifically, the bacteria in the infant's mouth then feeds on the sugar contained in the pooled liquid and this action creates acids that erode the infant's tooth enamel while the infant sleeps, in some cases causing rampant tooth decay. The tooth decay process begins with the presence of dental plaque, a sticky film of bacteria that forms on teeth and gums. These bacteria are naturally present in the mouth and form a biofilm on the teeth's surfaces. Bacteria in the plaque feed on carbohydrates, particularly sugars and starches found in the liquids or food consumed. As bacteria consume these sugars, they produce acids as byproducts, primarily lactic acid and acetic acid. The acids created by bacterial metabolism are harmful to tooth enamel, which is the outermost protective layer of the tooth. Enamel is a mineralized structure composed mainly of a crystalline material. When the pH level in the mouth drops due to acid production, the minerals in the enamel begin to dissolve in a process called demineralization. This weakens the enamel, making it softer and more susceptible to further breakdown. As the enamel becomes porous and weak, it eventually leads to the formation of a small hole or cavity in the enamel. Once the decay progresses beyond the enamel and reaches the underlying dentin layer, which is softer than enamel, it can spread more rapidly due to its composition. If the decay continues to progress, it can eventually reach the pulp, causing inflammation, infection, irritated mouths, and severe pain requiring oral surgery.

Tooth decay resulting from baby bottle syndrome can be reduced or prevented by improving habits such as promptly removing the bottle once the infant is asleep or not allowing infants to carry around the bottle throughout the day outside feeding times. Additionally, rinsing the infant's mouth with water after a feeding can rinse the sugary liquid off the teeth. However, prevention through such methods can often be inconvenient or difficult, and the hazardous problem of baby bottle syndrome persists.

The present disclosure addresses the problems associated with baby bottle syndrome by providing a novel nursing bottle having dual chambers for reducing tooth decay, as provided by the embodiments described herein and characterized in the claims.

SUMMARY

In the following description, certain aspects and embodiments will become evident. It should be understood that the invention, in its broadest sense, could be practiced without having one or more features of these aspects and embodiments. It should be understood that these aspects and embodiments are merely exemplary.

In general, the present disclosure relates to nursing bottles, and specifically to nursing bottles that reduce issues relating to baby bottle syndrome.

In one aspect, as embodied and broadly described herein, innovative aspects of the subject matter described in this specification can be embodied in a nursing bottle for reducing tooth decay in a user. The nursing bottle may comprise a first chamber adapted to contain a first liquid, the first chamber having a first opening and an end wall opposite the first opening; a second chamber adapted to contain a second liquid, wherein the second chamber is disposed within the first chamber; a nipple mounted on the first opening of the first chamber, wherein the nipple includes an elongated shaft extending away from the first opening and creating a reservoir, the elongated shaft having at least two lateral openings; and a tip having a central opening; a stopper adapted to seal the second chamber, the stopper including a central core; an outer ring defining two or more openings between the central core and the outer ring, the two or more openings enabling a flow of the first liquid from the first chamber to the reservoir of the nipple; and a cylindrical extension connected to the central core and having an end extending away from the second chamber, the end being disposed a first distance from the tip of the nipple, wherein the cylindrical extension defines a passage enabling the second liquid to flow from the second chamber towards the tip of the nipple, wherein the bottle is configured such that when the bottle is inverted, the first liquid fills the reservoir of the nipple and dispenses through the at least two lateral openings a volume of the first liquid falls below a threshold, and wherein the second liquid flows through the cylindrical extension and dispenses through the central opening.

In some implementations, once the volume of the first liquid falls below the threshold, a sucking action of the user enables the second liquid to flow through the cylindrical extension and dispense through the central opening.

In some implementations, the threshold comprises substantially all the volume of the first liquid.

In some implementations, the first distance is between 1 and 5 millimeters, between 0.1 and 1 millimeters, and/or between 0.1 and 0.5 millimeters.

In some implementations, the first liquid is water and the second liquid is a cariogenic liquid.

In some implementations, the first chamber comprises a threaded neck.

In some implementations, the nursing bottle further comprises a ring collar having a central ring opening, the ring collar being threaded and adapted to mate with the threaded neck to secure the nipple, the stopper, and the second chamber to the first chamber.

In some implementations, a length of the first chamber extends from the first opening to the end wall, and the second chamber extends away from the first opening to substantially half the length of the first chamber.

In some implementations, the cylindrical extension comprises a diameter smaller than a diameter of the second chamber.

In some implementations, the diameter of the cylindrical extension is operable to enable the second liquid to flow through the central opening after substantially all the first liquid is dispensed.

In some implementations, the at least two lateral openings each have a diameter larger than the diameter of the central opening.

In some implementations, the at least two lateral openings are each disposed at a 45 degree angle relative to an axis extending longitudinally along the cylindrical extension.

In some implementations, the at least two lateral openings are each disposed at an angle relative to an axis extending longitudinally along the cylindrical extension, the angle ranging from 35 to 55 degrees.

In some implementations, the first opening has a diameter smaller than a diameter of the end wall.

In another aspect, as embodied and broadly described herein, innovative aspects of the subject matter described in this specification can be embodied in a nursing bottle for reducing tooth decay in a user, the nursing bottle comprising a first chamber adapted to contain a first liquid, the first chamber having a first chamber opening and an end wall opposite the first chamber opening; a nipple mounted on the first chamber opening of the first chamber, wherein the nipple includes an elongated shaft extending away from the first chamber opening and creating a reservoir, the elongated shaft having at least two lateral openings; and a tip having a central opening; a second chamber adapted to contain a second liquid, the second chamber being disposed within the first chamber, the second chamber including a second chamber opening; an outer ring defining two or more openings between an outer edge of the second chamber opening and the outer ring, the two or more openings enabling a flow of the first liquid from the first chamber to the reservoir of the nipple; a stopper adapted to seal the second chamber opening, the stopper including a central core; and a cylindrical extension connected to the central core and having an end extending away from the second chamber, the end being disposed a first distance from the tip of the nipple, wherein the cylindrical extension defines a passage enabling the second liquid to flow from the second chamber towards the tip of the nipple, wherein the bottle is configured such that when the bottle is inverted, the first liquid fills the reservoir of the nipple and dispenses through the at least two lateral openings until a volume of the first liquid falls below a threshold, and wherein when the volume of the first liquid falls below the threshold, a sucking action of the user enables the second liquid to flow through the cylindrical extension and dispense through the central opening.

In some implementations, the threshold comprises substantially all the volume of the first liquid.

In some implementations, the first chamber opening includes a diameter smaller than a diameter of the end wall.

In some implementations, the first chamber opening includes a threaded neck and the outer ring of the second chamber is threaded, and the nursing bottle further comprises a ring collar having a central ring opening, the ring collar being threaded and adapted to mate with the threaded neck of the first chamber and the outer ring to secure the nipple, the stopper, and the second chamber to the first chamber.

In some implementations, the second chamber opening includes an inner lip; and the stopper is adapted to sit on the inner lip and seal the second chamber opening.

In some implementations, the at least two lateral openings are each disposed at an angle relative to an axis extending longitudinally along the cylindrical extension, the angle ranging from 35 to 55 degrees.

Additional features and advantages of the disclosed embodiments will be set forth in part in the description that follows, and in part will be obvious from the description, or may be learned by practice of the disclosed embodiments. The features and advantages of the disclosed embodiments will be realized and attained by the elements and combinations particularly pointed out in the appended claims.

It is to be understood that both the foregoing general description and the following detailed description are examples and explanatory only and are not restrictive of the disclosed embodiments as claimed.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF DRAWINGS

The accompanying drawings are incorporated in and constitute a part of this specification. The drawings illustrate exemplary embodiments and, together with the description, serve to explain some principles of the invention. In the drawings.

DETAILED DESCRIPTION

Reference will now be made in detail to embodiments and aspects of the present disclosure, examples of which are illustrated in the accompanying drawings. Where possible, the same reference numbers will be used throughout the drawings to refer to the same or like parts.

Figure 1:
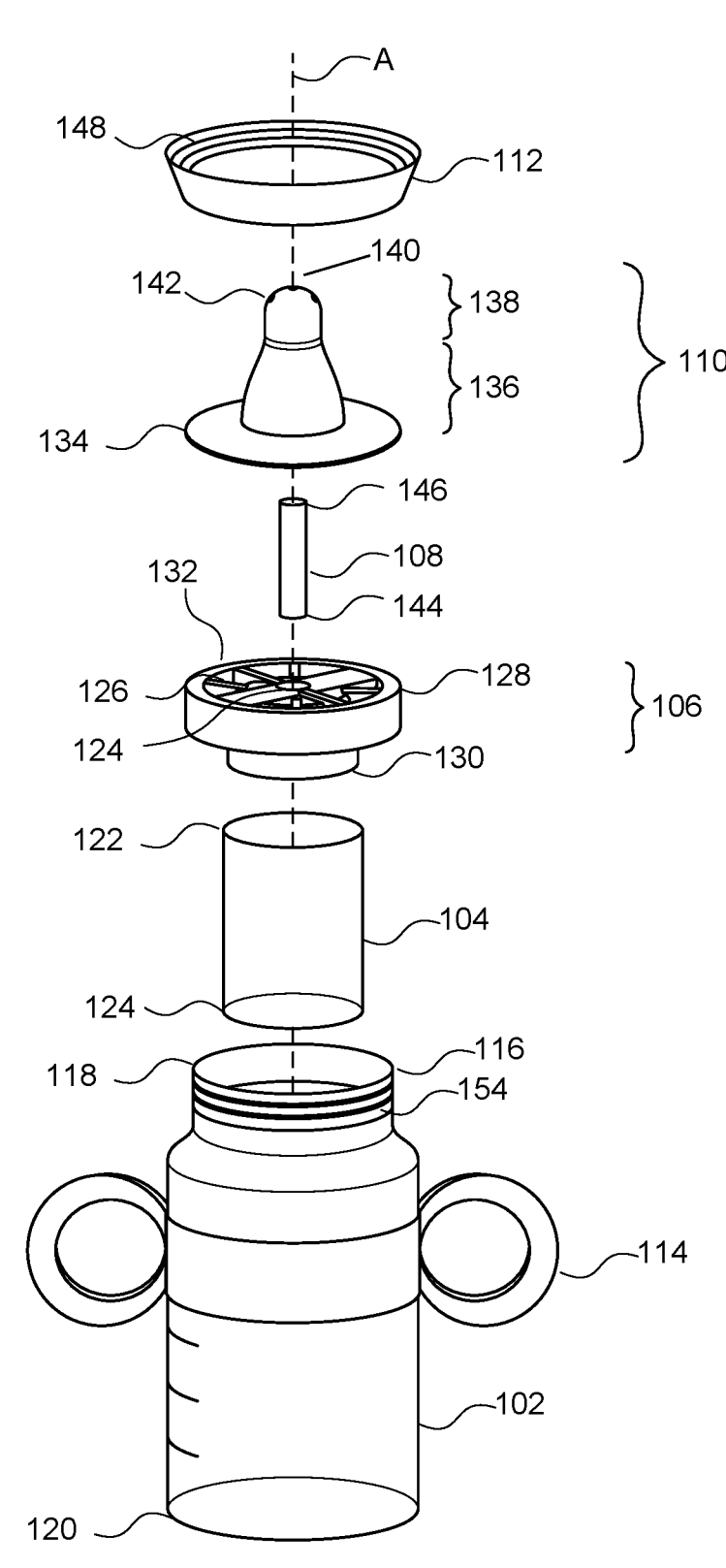
FIG. 1 is an exploded perspective view of an example nursing bottle.

FIG. 1 is an exploded perspective view of an exemplary nursing bottle 100. As shown in FIG. 1, nursing bottle 100 includes a first chamber 102, a second chamber 104, a stopper 106, an extension 108, a nipple 110, and a ring collar 112. First chamber 102 may be a chamber sized to hold an appropriate amount of liquid for nursing an infant or small child, for example between approximately 3 to 9 ounces (88 to 270 milliliters). The liquid may be any cariogenic liquid suitable for feeding an infant, such as milk, baby formula, juice, or other suitable sugary liquid. First chamber 102 may be substantially cylindrical and sized to enable an infant to grip or hold the bottle. For example, first chamber 102 may have a diameter of between approximately 2 to 7 centimeters (approximately 0.7 to 2.7 inches). First chamber 102 may also vary in height (length), for example, having a height (length) between approximately 5 to 26 centimeters (approximately 2 to 10 inches). In some aspects, first chamber 102 may include ridges for easier gripping. First chamber 102 may include a portion with a smaller diameter to enable easier gripping, for example first chamber 102 may resemble the shape of an hourglass to permit a toddler to grip first chamber 102 at the narrower portion. First chamber 102 may include an additional handle grip 114 to enable an infant to grip first chamber 102 with greater ease when the diameter of first chamber 102 is too large for the infant's hand to grip. Handle grip 114 may be rigid or flexible and made of any suitable material such as plastic, latex, or silicone.

First chamber 102 may include markings on the exterior to indicate a volume of liquid within the chamber. In some aspects, the markings may indicate the volume of liquid within first chamber 102 while taking into account the volume displaced by second chamber 104 being disposed within first chamber 102. First chamber 102 may be made of plastic, glass, or other suitable material for a nursing bottle, for example a thermoplastic material such as polypropylene, polycarbonate, or similar material blends. First chamber 102 may include a neck or collar 116 having an opening 118 on one end and a bottom or end wall 120 on the opposite end. Collar 116 and/or opening 118 may have a diameter that is smaller than the diameter of first chamber 102. Collar 116 may include a threaded portion 154 on the exterior to mate with another threaded portion of another component, as described further herein.

Nursing bottle 100 includes second chamber 104 for holding a volume of liquid. The liquid may be water or other suitable liquid for rinsing cariogenic liquids that are found on an infant's teeth or inside an infant's mouth after feeding. Second chamber 104 may be substantially cylindrical and sized to fit within first chamber 102. For example, second chamber 104 may have a diameter smaller than the diameter of first chamber 102 and/or opening 118 of first chamber 102. For example, second chamber 104 may have a diameter of between 1 and 5 centimeters (approximately 0.4 to 2 inches) and will generally have a diameter smaller than the diameter of first chamber 102 such that second chamber 104 may be disposed within first chamber 102. Second chamber 104 may also vary in height (length), for example, having a height (length) between approximately 2 to 20 centimeters (approximately 0.7 to 8 inches). In some aspects, second chamber 104, when disposed within first chamber 102, extends to substantially half the height (length) of first chamber 102, or extends to substantially end wall 120. In some aspects, second chamber 104 can extend within first chamber 102 at various heights (lengths) based on a height (length) of second chamber 104 and a height (length) of first chamber 102 within the ranges described herein. Second chamber 104 includes an opening 122 on one end and a bottom or end wall 124 on the opposite end. Opening 122 may be disposed on a collar portion having a diameter that is smaller than the diameter of second chamber 104. Second chamber 104 may include markings on the exterior to indicate a volume of liquid within chamber 104. Second chamber 104 may be made of material similar to first chamber 102, for example glass or a thermoplastic material such as polypropylene, polycarbonate, or similar material blends.

As shown in FIG. 1, nursing bottle 100 includes stopper 106 that is configured to seal the opening 122 of second chamber 104. Stopper 106 may include an outer ring 128 and a central core 124 disposed centrally within outer ring 128. Two or more spokes 126 extend radially and outwards from central core 124 to outer ring 128. In some aspects, spokes 126 are evenly spaced and may include four, six, eight, or ten spokes. The evenly spaced spokes 126 define openings 132 between central core 124 and outer ring 128 that enable the flow of liquid. For example, openings 132 may fluidly connect first chamber 102 to nipple 110. In some aspects, stopper 106 may include bottom plug 130 connected to central core 124. Bottom plug 130 may include a diameter of sufficient size to fit tightly within, and seal, opening 122 of second chamber 104. For example, bottom plug 130 may include a diameter between 0.1 to 3 millimeters smaller than the diameter of opening 122. In some aspects, bottom plug 130 includes a diameter that is smaller than the diameter of outer ring 128, such that a user may insert stopper 106 into opening 122 of second chamber 104 until outer ring 128 makes contact with an upper edge of opening 122, thereby sealing opening 122. In some aspects, bottom plug 130 may include a substantially flat lower end or a dome-like lower end. Central core 124 and bottom plug 130 may each include a through hole or opening of sufficient size to enable extension 108 to pass through, as further described herein. Stopper 106 may be rigid or flexible and made of any suitable material such as silicone or thermoplastic material such as polypropylene, polycarbonate, or similar material blends.

Figure 2:
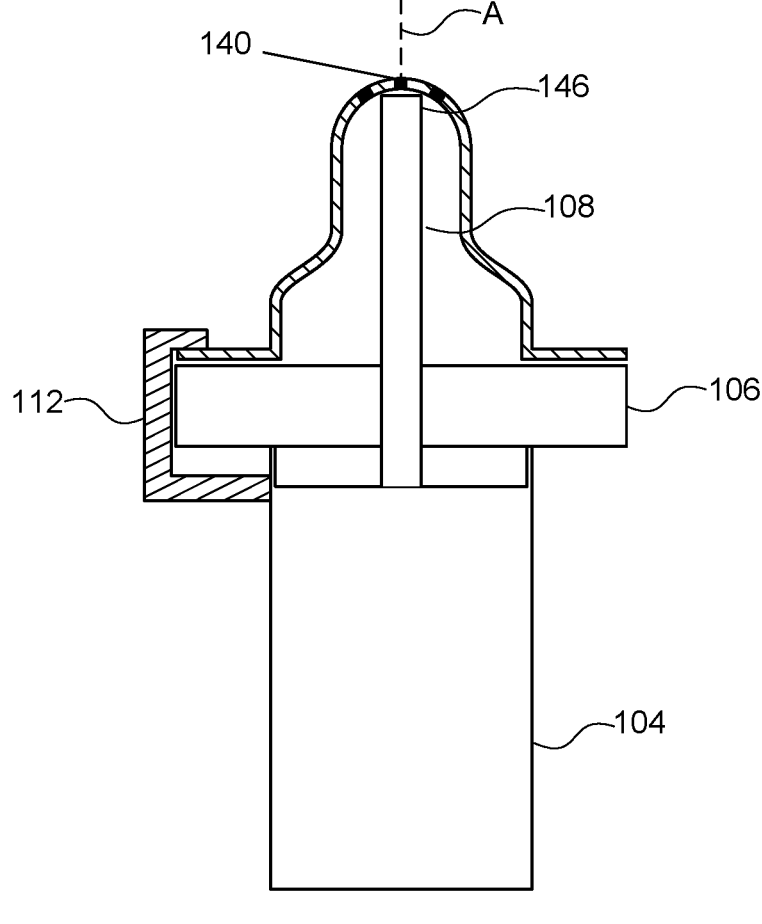
FIG. 2 is a cross-sectional side view of an example nursing bottle.

Nursing bottle 100 includes a cylindrical extension 108. In some aspects, central core 124 and bottom plug 130 each include a through hole or opening through which extension 108 is disposed, thereby fluidly connecting second chamber 104 and nipple 110. Extension 108 thus enables passage of the liquid held in second chamber 104 through extension 108 to nipple 110. Extension 108 extends away from the second chamber 104 towards nipple 110, as depicted in FIG. 1 and FIG. 2. Extension 108 can extend slightly within second chamber or extend just to the surface of bottom plug 130. Extension 108 may comprise a diameter smaller than a diameter of second chamber 104, and specifically of a diameter that sufficiently fits within nipple 110. Extension 108 may be rigid and/or flexible and made of flexible plastic or silicone. In some aspects, extension 108 and stopper 106 constitute a single molded piece. In some aspects, extension 108 and stopper 106 are separate pieces.

Nursing bottle 100 includes a nipple 110. Nipple 110 allows an infant to access liquid from either chamber 102 and chamber 104 when feeding. Nipple 110 is made of flexible material, such as silicone or thermoplastic material such as polypropylene, polycarbonate, or similar material blends. Nipple 110 may include a base 134 that is circular and allows nipple 110 to sit on opening 118, as further discussed below. Base 134 includes a diameter of substantially the same size as opening 118 of first chamber 102. In some aspects, base 134 includes a diameter slightly larger than the diameter of opening 118, for example 0.1 to 3 millimeters larger. Nipple 110 may include a shape typical of baby bottle nipples, and includes reservoir 136 and tip 138. Tip 138 includes central opening 140 through which liquid may flow. Central opening 140 may be sized to provide an appropriate flow rate for the infant. For example, the flow rate may be based on the infant's age, size, feeding habits, preferences, or the type of liquid being consumed. Some infants benefit from a faster flow while others may prefer a slower passage of liquid. For example, a smaller diameter creates a lower flow rate while a larger diameter creates a larger flow rate. In some aspects, central opening 140 is sized to minimize the flow of liquid from second chamber 104 to a suckling infant until a substantial volume of the liquid from first chamber 102 has been consumed by the infant, as discussed in further detail herein.

Tip 138 includes one or more lateral openings 142 through which liquid may flow. FIG. 1 depicts two lateral openings 142, but in some aspects, there may be two, three, four, six, or eight lateral openings 142 disposed radially around tip 138. Lateral openings 142 may be disposed on tip 138 at a 45 degree angle relative to axis A (as shown in FIG. 1), where axis A extends longitudinally along the cylindrical extension. In some aspects, lateral openings 142 may be disposed on tip 138 at an angle relative to axis A ranging from 25 to 55 degrees, or 35 to 55 degrees. In some aspects, lateral openings 142 may be disposed on tip 138 at an angle relative to axis A ranging from 25 to 90 degrees. Lateral openings 142 may be sized to provide an appropriate flow rate for the infant based on the infant's age, size, feeding habits, preferences, or the type of liquid being consumed. Some infants benefit from a faster flow while others may prefer a slower passage of milk. For example, a smaller diameter creates a lower flow rate while a larger diameter creates a larger flow rate.

As depicted in FIG. 1, nursing bottle 100 includes ring collar 112 for securing the components of nursing bottle 100 together and creating a leak proof seal. For example, ring collar 112 includes internal threads 148 (FIG. 2) for mating with threads of other components, including external threads 154 of neck 116 of first chamber 102. Ring collar 112 includes an opening through which nipple 110 is disposed, while securing base 134 within an upper lip (as shown in FIG. 2) of ring collar 112. Ring collar 112 secures nipple 110, stopper 106, extension 108, and second chamber 104 to first chamber 102. In some aspects, ring collar 112 includes ridges on its exterior to assist a user with turning and securing the ring collar 112 to threads 154 of neck 116.

FIG. 2 depicts a cross-sectional side view of the nursing bottle 100 of FIG. 1, and more specifically an upper portion of nursing bottle 100 as assembled. As depicted in FIG. 2 (and with reference to FIG. 1), second chamber 104 is sealed by stopper 106. Extension 108 is cylindrical and has a first end 144 disposed in opening of core 124 of stopper 106. Extension 108 has a second end 146 that extends within nipple 110 towards tip 138. The length of extension 108 is configured such that second end 146 is disposed close to central opening 140, creating an air gap between second end 146 and central opening 140. In some aspects, second end 146 is disposed a distance ranging between 1 and 5 millimeters from central opening 140, or between 0.1 and 1 millimeter, or between 0.1 and 0.5 millimeters. In some aspects, second end 146 is disposed as close as possible to central opening 140 without touching central opening 140. In some aspects, second end 146 extends all the way to central opening 140 such that there is no air gap between second end 146 and central opening 140. For example, extension 108 may connect to tip 138 such that any liquid carried by extension 108 can only exit through central opening 140. Extension 108 defines a passage enabling the liquid contained in second chamber 104 to flow from the second chamber towards tip 138 of nipple 110.

To assemble the nursing bottle 100 depicted in FIG. 1, a user may insert stopper 106 into opening 122 of second chamber 104. The user may push stopper 106 until an upper edge of opening 122 touches a lower edge of outer ring 128, thereby ensuring bottom plug 130 has created a waterproof seal. User may insert extension 108 into the opening of core 124. In some aspects, the user may insert extension 108 into opening of core 124 before inserting stopper 106 into second chamber 104. In some aspects, extension 108 and stopper 106 form a single piece, and in such instances the user may skip the step of inserting extension 108 into opening of core 124. The user may then insert nipple 110 through the opening of ring collar 112 until the base 134 of nipple 110 reaches an upper lip of ring collar 112. For example, user may pull on nipple 110 while grasping ring collar 112 to secure the two components to one another. User may then place second chamber 104, with stopper 106 attached thereto, inside first chamber 102 such that stopper 106 rests on opening 118. User may secure ring collar 112, with nipple 110 secured thereto, to first chamber 102, by using a twisting motion to secure the inner threads 148 of ring collar 112 to the outer threads 154 of neck 116 of first chamber 102. In this way, ring collar 112 secures nipple 110, stopper 106, extension 108, and second chamber 104 to first chamber 102. A user may fill first chamber 102 with a liquid to the appropriate volume before assembly. User may also fill second chamber 104 with a liquid to the appropriate volume before inserting stopper 106 or through extension 108 after inserting stopper 106.

Figure 3A:
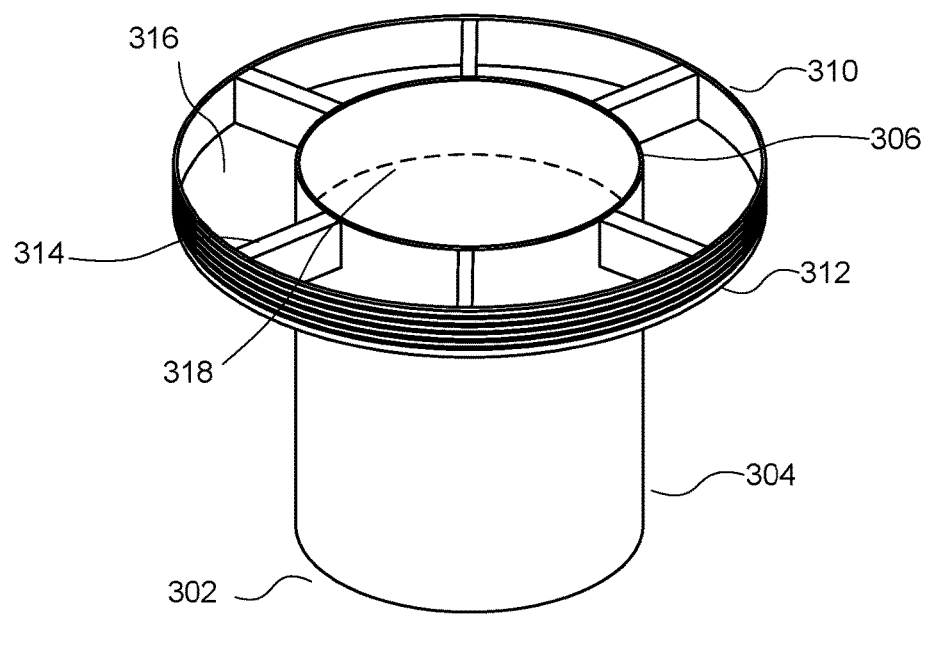
FIG. 3A is a perspective view of another example nursing bottle.

FIG. 3A depicts an alternative embodiment of nursing bottle 100. As shown in FIG. 3A, second chamber 304 is adapted to hold a volume of liquid, such as water or any other suitable liquid for rinsing cariogenic liquids. Second chamber 304 may be substantially cylindrical and sized to fit within first chamber 102, similar to aspects of second chamber 104 discussed with respect to FIG. 1. Second chamber 304 includes an opening 306 and an opposing end wall 302 that are of substantially the same diameter. In some aspects, opening 306 may be disposed on a collar portion having a diameter that is smaller than the diameter of second chamber 304. As shown in FIG. 3A, along the same plane as opening 306 is an outer ring 310 with a diameter larger than the diameter of opening 306. Outer ring 310 may be made of the same material as second chamber 304 to provide a rigid structure. Spokes 314 extend radially and outwards from an outer edge of opening 306 to an inner edge of outer ring 310. Spokes 314 may comprise two or more spokes that are evenly spaced radially around opening 306. For example, outer ring 310 may include two, four, six, eight, or ten spokes. Spokes 314 define openings 316 between opening 306 and outer ring 310 that enable the flow of liquid. For example, openings 316 may fluidly connect first chamber 102 to nipple 110 when assembled.

Figure 3B:
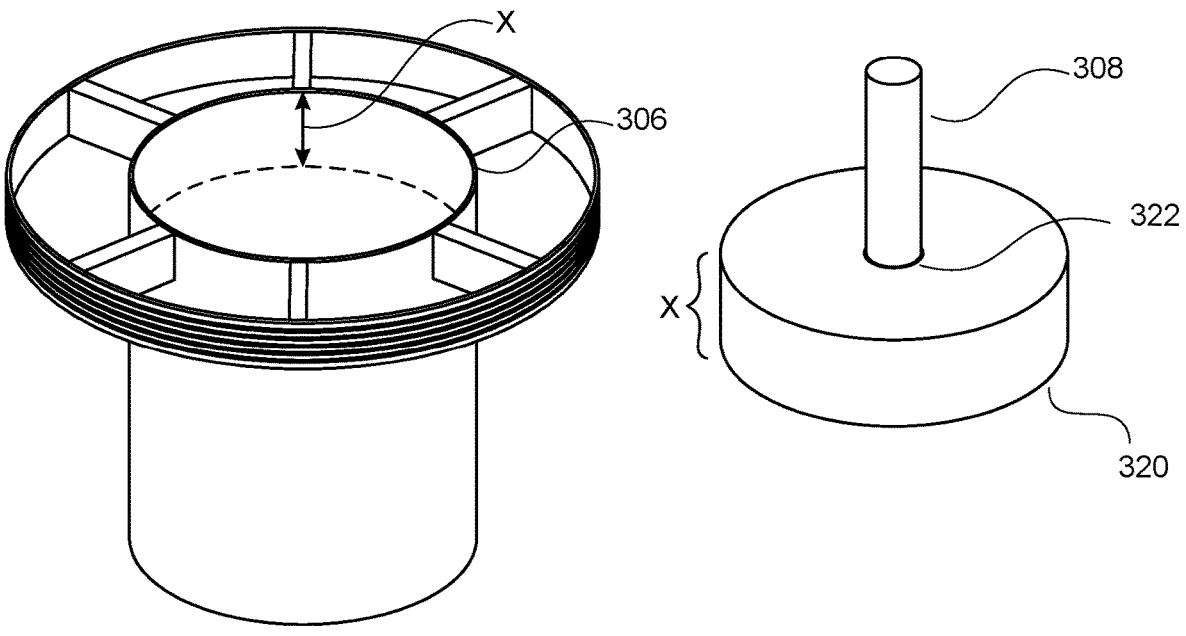
FIG. 3B is a perspective view of the example nursing bottle of FIG. 3A.

FIG. 3B depicts a side view of the alternative embodiment of nursing bottle 100 depicted in FIG. 3A. As shown in FIG. 3B, stopper 320 is configured to seal opening 306 of second chamber 304. Stopper 320 includes a central opening 322 through which extension 308 is disposed. The central opening may be of sufficient size to enable extension 308 to pass through while creating a waterproof seal. In some aspects, second chamber 304 includes a ledge or protruding lip 318 disposed on an inner side of second chamber 304 such that stopper 320 is adapted to make contact with lip 318 when pushed inside second chamber 304 to create the seal. Lip 318 may include two or more lips disposed radially on the inner side of second chamber 304. In some aspects, lip 318 is radially disposed along the entire diameter of inner side of second chamber 304. In some aspects, lip 318 may be disposed a distance from top of opening 306 that is equal to a thickness of stopper 320, such that when stopper 320 seals opening 306 an upper end of stopper 320 is flush with an upper end of opening 306.

As depicted in FIGS. 3A-B, outer ring 310 may include a threaded portion on the exterior to mate with another threaded portion of another component. For example, the threads 312 of outer ring 310 may mate with threads 148 of ring collar 112 (as shown in FIG. 1 and FIG. 2). In this way, a user may insert second chamber 304 within ring collar 112 and twist the components such that they mate to one another. For example, to assemble the nursing bottle of FIG. 3A-B, a user inserts stopper 320 into opening 306 of second chamber 304 until stopper 320 reaches lip 318 to create a seal. The user may then insert extension 308 into opening 322. In some aspects, the user may insert extension 308 into opening 322 before inserting stopper 320 into second chamber 304. The user may then insert nipple 110 through the opening of ring collar 112 until the base 134 of nipple 110 reaches an upper lip of ring collar 112 (see FIG. 1). The user may then insert second chamber 304 within ring collar 112 and using a twisting motion, secure the two components via their respective threads. Ring collar 112, now being attached to outer ring 310, is then coupled with the threads of neck 116 of first chamber 102. Ring collar 112 is of sufficient height such that both second chamber 304 and first chamber 102 may mate via their respective threaded portions to the internal threads 148 of ring collar 112.

Figure 4:
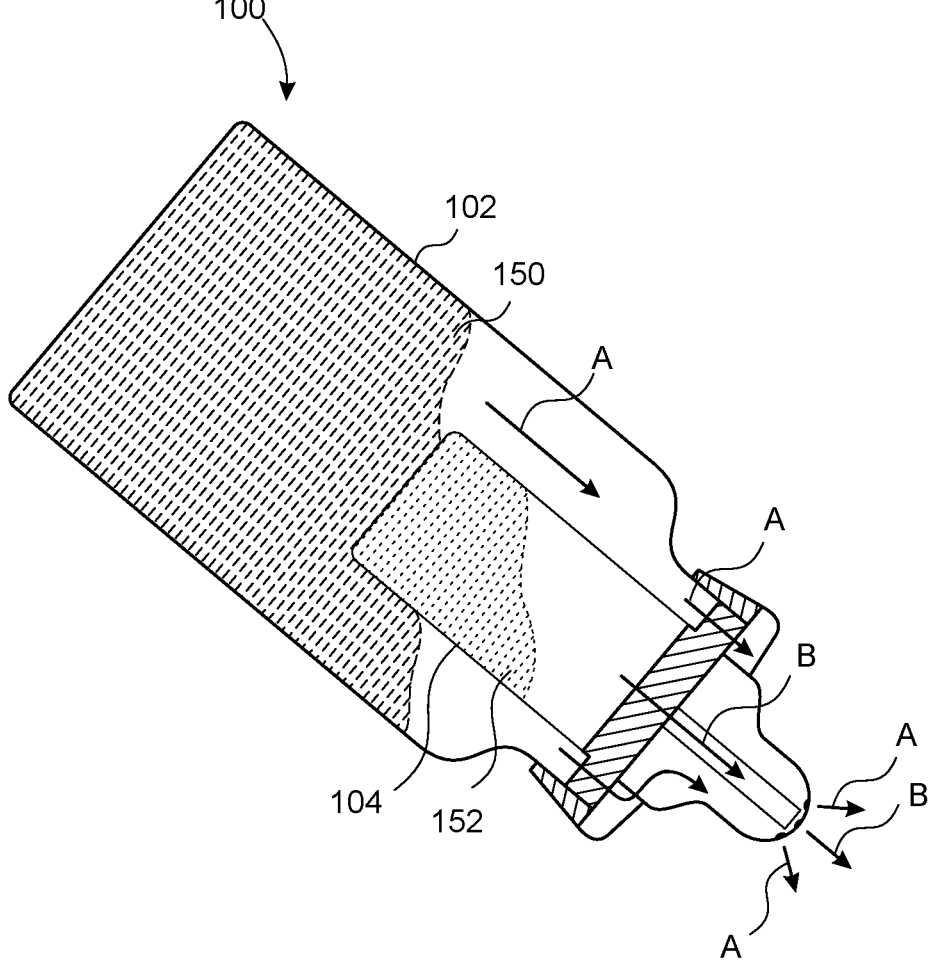
FIG. 4 is a cross-sectional side view of an example nursing bottle in use.

FIG. 4 is a schematic illustrating how an example nursing bottle 100 can be configured to reduce issues relating to baby bottle syndrome. A user may insert an appropriate volume of a first liquid 150, such as milk, formula, juice, or other cariogenic liquid as described above, into first chamber 102. User may insert an appropriate volume of a second liquid 152, such as water, into second chamber 104. In some aspects, user may fill second chamber 104 before sealing opening 122 with stopper 106, or by inserting second liquid 152 through extension 108 after sealing opening 122 with stopper 106. After assembling the nursing bottle 100 (as further described herein) an infant (or other user) may grip nursing bottle 100 and invert the bottle as depicted in FIG. 4 and insert nipple 110 into the infant's mouth. As described herein, to invert the bottle means to turn the bottle from an upright position to any angle suitable for the infant to feed from the bottle. Once the bottle is inverted, first liquid 150 flows along flow arrow A from first chamber 102 through openings 132 of stopper 106 into nipple 110, filling up the reservoir 136 and/or tip 138. Liquid 150 is then dispensed through lateral openings 142 as depicted through flow arrow A. Infant may suckle on the nipple to dispense first liquid 150 through lateral openings 142. When an infant suckles on the nipple and milk is dispensed, the volume of milk decreases and causes a drop in air pressure inside first chamber 102. The difference in air pressure inside and outside the bottle causes air from outside the bottle to rush in through lateral openings 142 and/or central opening 140 to rebalance the pressure inside first chamber 102. In this way, the infant is able to continue feeding through sucking on nipple 110. In some aspects, the number and size of lateral openings 142, the size of central opening 140, and/or the distance between central end 146 and central opening 140 is configured such that first liquid 150 is primarily dispensed through lateral openings 142. For example, increasing the number of lateral openings 142 and the size of lateral openings 142, while decreasing the size of central opening 140 and the distance between central end 146 and central opening 140, may enable first liquid 150 to be dispensed primarily through lateral openings 142. In some aspects, some of liquid 150 may be dispensed through central opening 140.

Once most and/or substantially all of first liquid 140 is dispensed through nipple 110, the continued action of infant's suckling enables second liquid 152 to flow out central opening 140 into the infant's mouth while nursing bottle is inverted. As described herein, most of first liquid 140 may comprise between 80-95% of the volume of first liquid 140 and substantially all of the first liquid 140 may comprise between 95-100% of the volume of first liquid 140. As depicted in FIG. 4, second liquid 152 flows along flow arrow B from second chamber 104 through extension 108 and out central opening 140 into the infant's mouth. In some aspects, the size of central opening 140 and/or the distance between central end 146 and central opening 140 is configured such that second liquid 152 is primarily dispensed through central opening 140 after first liquid 150 has been dispensed. With substantially all the first liquid 150 dispensed from first chamber 102, the suckling action of infant causes second liquid 152 to dispense through central opening 140. This creates an air pressure differential within second chamber 104 such that air from outside the bottle rushes in through central opening 140 and/or lateral openings 142 to rebalance the pressure inside second chamber 104. In this way, through sucking on nipple 110, the infant's teeth are rinsed with the second liquid 152 before ending the infant's feeding, reducing or eliminating tooth decay resulting from first liquid 150 remaining on the infant's teeth.

The foregoing description has been presented for purposes of illustration. It is not exhaustive and is not limited to precise forms or embodiments disclosed. Modifications and adaptations of the embodiments will be apparent from consideration of the specification and practice of the disclosed embodiments. For example, while certain components have been described as being coupled to one another, such components may be integrated with one another or distributed in any suitable fashion.

Moreover, while illustrative embodiments have been described herein, the scope includes any and all embodiments having equivalent elements, modifications, omissions, combinations (e.g., of aspects across various embodiments), adaptations and/or alterations based on the present disclosure. The elements in the claims are to be interpreted broadly based on the language employed in the claims and not limited to examples described in the present specification or during the prosecution of the application, which examples are to be construed as nonexclusive. Further, the steps of any disclosed methods can be modified in any manner, including reordering steps and/or inserting or deleting steps.

The features and advantages of the disclosure are apparent from the detailed specification, and thus, it is intended that the appended claims cover all apparatuses, devices, systems and methods falling within the true spirit and scope of the disclosure. As used herein, the indefinite articles "a" and "an" mean "one or more." Similarly, the use of a plural term does not necessarily denote a plurality unless it is unambiguous in the given context. Words such as "and" or "or" mean "and/or" unless specifically directed otherwise. Further, since numerous modifications and variations will readily occur from studying the present disclosure, it is not desired to limit the disclosure to the exact construction and operation illustrated and described, and accordingly, all suitable modifications and equivalents may be resorted to, falling within the scope of the disclosure.

Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. A nursing bottle for reducing tooth decay in a user, comprising:

a first chamber adapted to contain a first liquid, the first chamber having a first opening and an end wall opposite the first opening, wherein the first liquid is a cariogenic;

a second chamber adapted to contain a second liquid, wherein the second chamber is disposed within the first chamber;

a nipple mounted on the first opening of the first chamber, wherein the nipple includes:

a reservoir extending away from the first opening; and a tip connected to the reservoir and having an elongated shape and a central opening at an end of the tip, the tip further having at least two lateral openings;

a stopper adapted to seal the second chamber, the stopper including:
  a central core;
  an outer ring defining two or more openings between the central core and the outer ring, the two or more openings enabling a flow of the first liquid from the first chamber to the reservoir of the nipple; and
  a cylindrical extension connected to the central core and having an end extending away from the second chamber, the end being disposed a first distance from the tip of the nipple, wherein the cylindrical extension defines a passage enabling the second liquid to flow from the second chamber towards the tip of the nipple, wherein the first distance is between 0.1 and 1 millimeters,
wherein the bottle is configured such that when the bottle is inverted, the first liquid fills the reservoir of the nipple and a substantial volume of the first liquid dispenses through the at least two lateral openings in relation to the central opening until a volume of the first liquid falls below a threshold, and wherein the second liquid flows through the cylindrical extension and dispenses through the central opening, wherein a substantial volume of the second liquid dispenses through the central opening in relation to the at least two lateral openings.

2. The nursing bottle of claim 1, wherein once the volume of the first liquid falls below the threshold, a sucking action of the user enables the second liquid to flow through the cylindrical extension and dispense through the central opening.

3. The nursing bottle of claim 2, wherein the threshold comprises substantially all the volume of the first liquid.

4. The nursing bottle of claim 1, wherein the first distance is between 0.1 and 0.5 millimeters.

5. The nursing bottle of claim 1, wherein the second liquid is water.

6. The nursing bottle of claim 1, wherein the first chamber comprises a threaded neck, the nursing bottle further comprising:
  a ring collar having a central ring opening, the ring collar being threaded and adapted to mate with the threaded neck to secure the nipple, the stopper, and the second chamber to the first chamber.

7. The nursing bottle of claim 1, wherein a length of the first chamber extends from the first opening to the end wall, and wherein the second chamber extends away from the first opening to substantially half the length of the first chamber.

8. The nursing bottle of claim 1, wherein the cylindrical extension comprises a diameter smaller than a diameter of the second chamber.

9. The nursing bottle of claim 8, wherein the diameter of the cylindrical extension is operable to enable the second liquid to flow through the central opening after substantially all the first liquid is dispensed.

10. The nursing bottle of claim 1, wherein the at least two lateral openings each have a diameter larger than the diameter of the central opening.

11. The nursing bottle of claim 1, wherein the at least two lateral openings are each disposed at a 45 degree angle relative to an axis extending longitudinally along the cylindrical extension.

12. The nursing bottle of claim 1, wherein the at least two lateral openings are each disposed at an angle relative to an axis extending longitudinally along the cylindrical extension, the angle ranging from 35 to 55 degrees.

13. The nursing bottle of claim 1, wherein the first opening has a diameter smaller than a diameter of the end wall.

14. A nursing bottle for reducing tooth decay in a user, comprising:
  a first chamber adapted to contain a first liquid, the first chamber having a first chamber opening and an end wall opposite the first chamber opening, wherein the first liquid is a cariogenic;
  a nipple mounted on the first chamber opening of the first chamber, wherein the nipple includes:
    a reservoir extending away from the first chamber opening; and
    a tip connected to the reservoir and having an elongated shape and a central opening at an end of the tip, the tip further having at least two lateral openings;
  a second chamber adapted to contain a second liquid, the second chamber being disposed within the first chamber, the second chamber including:
    a second chamber opening;
    an outer ring defining two or more openings between an outer edge of the second chamber opening and the outer ring, the two or more openings enabling a flow of the first liquid from the first chamber to the reservoir of the nipple;
  a stopper adapted to seal the second chamber opening, the stopper including:
    a central core; and
    a cylindrical extension connected to the central core and having an end extending away from the second chamber towards the tip of the nipple and connecting to the central opening, wherein the cylindrical extension defines a passage enabling the second liquid to flow from the second chamber towards the central opening,
wherein the bottle is configured such that when the bottle is inverted, the first liquid fills the reservoir of the nipple and dispenses through the at least two lateral openings until a volume of the first liquid falls below a threshold, and wherein once the volume of the first liquid falls below the threshold, a sucking action of the user enables the second liquid to flow through the cylindrical extension and dispense through the central opening.

15. The nursing bottle of claim 14, the first chamber opening having a diameter smaller than a diameter of the end wall.

16. The nursing bottle of claim 15, wherein the first chamber comprises a threaded neck and the outer ring of the second chamber is threaded, the nursing bottle further comprising:
  a ring collar having a central ring opening, the ring collar being threaded and adapted to mate with the threaded neck of the first chamber and the outer ring to secure the nipple, the stopper, and the second chamber to the first chamber.

17. The nursing bottle of claim 16, wherein:
  the second chamber opening includes an inner lip; and
  the stopper is adapted to sit on the inner lip and seal the second chamber opening.

18. The nursing bottle of claim 14, wherein the at least two lateral openings are each disposed at an angle relative to an axis extending longitudinally along the cylindrical extension, the angle ranging from 35 to 55 degrees.

19. The nursing bottle of claim 14, wherein the at least two lateral openings each have a diameter larger than the diameter of the central opening.

\* \* \* \* \*